United States Patent
Lo et al.

(10) Patent No.: US 9,753,598 B2
(45) Date of Patent: Sep. 5, 2017

(54) SENSING DEVICE

(71) Applicant: IMAGE MATCH DESIGN INC., Hsinchu (TW)

(72) Inventors: Yen-Kuo Lo, Tainan (TW); Chia-Hua Yeh, Hsinchu (TW)

(73) Assignee: IMAGE MATCH DESIGN INC., Hsinchu County (TW)

( * ) Notice: Subject to any disclaimer, the term of this patent is extended or adjusted under 35 U.S.C. 154(b) by 21 days.

(21) Appl. No.: 14/985,312

(22) Filed: Dec. 30, 2015

(65) Prior Publication Data

US 2017/0192553 A1 Jul. 6, 2017

(51) Int. Cl.
G06F 3/044 (2006.01)

(52) U.S. Cl.
CPC .................... *G06F 3/044* (2013.01)

(58) Field of Classification Search
CPC ........ G06F 3/044; G06F 3/041; G06F 2203/04103; G06F 2203/04107; G02F 1/13338; H03K 17/955; H03K 17/962; H05K 1/0296; H05K 1/0298; G01R 27/26; G01R 27/2605; G01R 27/28
See application file for complete search history.

(56) References Cited

U.S. PATENT DOCUMENTS

| | | | | |
|---|---|---|---|---|
| 5,442,347 A * | 8/1995 | Vranish | ........... | G01V 3/088 324/686 |
| 9,151,792 B1 * | 10/2015 | Kremin | ........... | G01R 27/2605 |
| 9,229,587 B2 * | 1/2016 | Kawaguchi | ........... | G06F 3/041 |
| 9,322,862 B2 * | 4/2016 | Chou | ........... | G06F 3/044 |
| 2001/0022337 A1 * | 9/2001 | Basse | ........... | G06K 9/0002 250/208.1 |
| 2011/0080373 A1 | 4/2011 | Wang et al. | | |
| 2015/0233989 A1 * | 8/2015 | Chou | ........... | G01R 27/2605 345/174 |

FOREIGN PATENT DOCUMENTS

TW    I419028    12/2013

OTHER PUBLICATIONS

Office Action dated Jun. 9, 2017 for the Taiwan counterpart application 105136202.
English abstract translation of the Office Action dated Jun. 9, 2017 for the Taiwan counterpart application 105136202.
English abstract translation of TW I419028.

* cited by examiner

*Primary Examiner* — Jennifer Mehwood
*Assistant Examiner* — Sardis F Azongha
(74) *Attorney, Agent, or Firm* — WPAT, P.C., Intellectual Property Attorneys; Anthony King (57) ABSTRACT

A sensing device includes a substrate, a sensing component and a shielding device. The sensing component is configured to detect a touch capacitance in response to a touch event on the sensing device. The shielding device, between the substrate and the sensing component, is configured to distribute electrical energy, and shield the substrate from the sensing component.

13 Claims, 11 Drawing Sheets

SENSING DEVICE

TECHNICAL FIELD

The present disclosure is generally related to an electronic device and, more particularly, to a sensing device.

BACKGROUND

Nowadays, touch devices are widely used in conjunction with electronic devices. For example, touch devices have been applied to smart phones and laptop computers. With touch devices, a user can easily operate a smart phone or laptop computer. While touch devices bring a new era of user interface, touch sensitivity has been the subject of interest in developing advanced touch devices.

SUMMARY

Embodiments of the present disclosure provide a sensing device includes a substrate, a sensing component and a shielding device. The sensing component is configured to detect a touch capacitance in response to a touch event on the sensing device. The shielding device, between the substrate and the sensing component, is configured to distribute electrical energy, and shield the substrate from the sensing component.

In an embodiment, the sensing component and the shielding device are configured to define a capacitance for storing electrical energy.

In another embodiment, the shielding device includes a first conductive component over the substrate, and a second conductive component between the substrate and the first conductive component. The second conductive component is configured to define a capacitance, together with the first conductive component, for storing electrical energy.

In yet another embodiment, the sensing component is fully shielded from the substrate by the first and second conductive components.

In still another embodiment, a distance between the first conductive component and the sensing component is smaller than that between the first conductive component and the second conductive component.

In yet still another embodiment, the first conductive component is configured to overlap a portion of the sensing component.

In further another embodiment, the sensing component is overlapped by the first conductive component in an overlap ratio of K. A difference between a first voltage level at the sensing component with the touch capacitance detected and a second voltage level at the sensing component without the touch capacitance detected is a function of K.

In still further another embodiment, the difference can be expressed below.

$$\Delta V1 = \frac{-VDD \times CF}{\left[\left(C1 \times \frac{(1-K)D1 + K \cdot D3}{K \cdot D3}\right) + CF\right] \times \left[1 + \frac{(1-K) \times D1}{K \times D3}\right]}$$

where $\Delta V1$ represents the difference between the first voltage level and the second voltage level, VDD represents a supply voltage, CF represents the touch capacitance, D1 represents a distance between the first conductive component and the second conductive component, and D3 represents a distance between the sensing component and the substrate.

In a yet further embodiment, the first and second conductive components are disposed between the substrate and the sensing component.

In a still yet embodiment, in response to an event that the shielding device distributes electrical energy, a voltage level of the first conductive component is the same as that of the sensing component.

In a further yet embodiment, the second conductive component and the substrate are coupled to a reference voltage.

In a still further yet embodiment, the shielding device includes a conductive component. The conductive component is configured to shield the substrate from the sensing component. The conductive component and the substrate are configured to define a capacitance for storing electrical energy.

In an additional embodiment, the sensing component is fully shielded from the substrate by the conductive component.

In a further embodiment again, the conductive component is disposed between the sensing component and the substrate.

In a further additional embodiment, the conductive component is configured to overlap a portion of the sensing component.

In a still further another additional embodiment, the sensing component is overlapped by the conductive component in an overlap ratio of K, wherein a difference between a first voltage level at the sensing component with the touch capacitance detected and a second voltage level at the sensing component without the touch capacitance detected is a function of K.

The sensing device of the invention provides a better touch sensitivity by decreasing a capacitance defined by a sensing component for detecting a capacitance in response to a touch event and a substrate.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Details of one or more embodiments of the disclosure are set forth in the accompanying drawings and the description below. Other features and advantages of the disclosure will be apparent from the description, drawings and claims.

DETAIL DESCRIPTION

In order to make the disclosure completely comprehensible, detailed steps and structures are provided in the following description. Obviously, implementation of the disclosure does not limit special details known by persons skilled in the art. In addition, known structures and steps are not described in detail, so as not to limit the disclosure unnecessarily. Preferred embodiments of the disclosure will be described below in detail. However, in addition to the detailed description, the disclosure may also be widely implemented in other embodiments. The scope of the disclosure is not limited to the detailed description, and is defined by the claims.

Figure 1A:
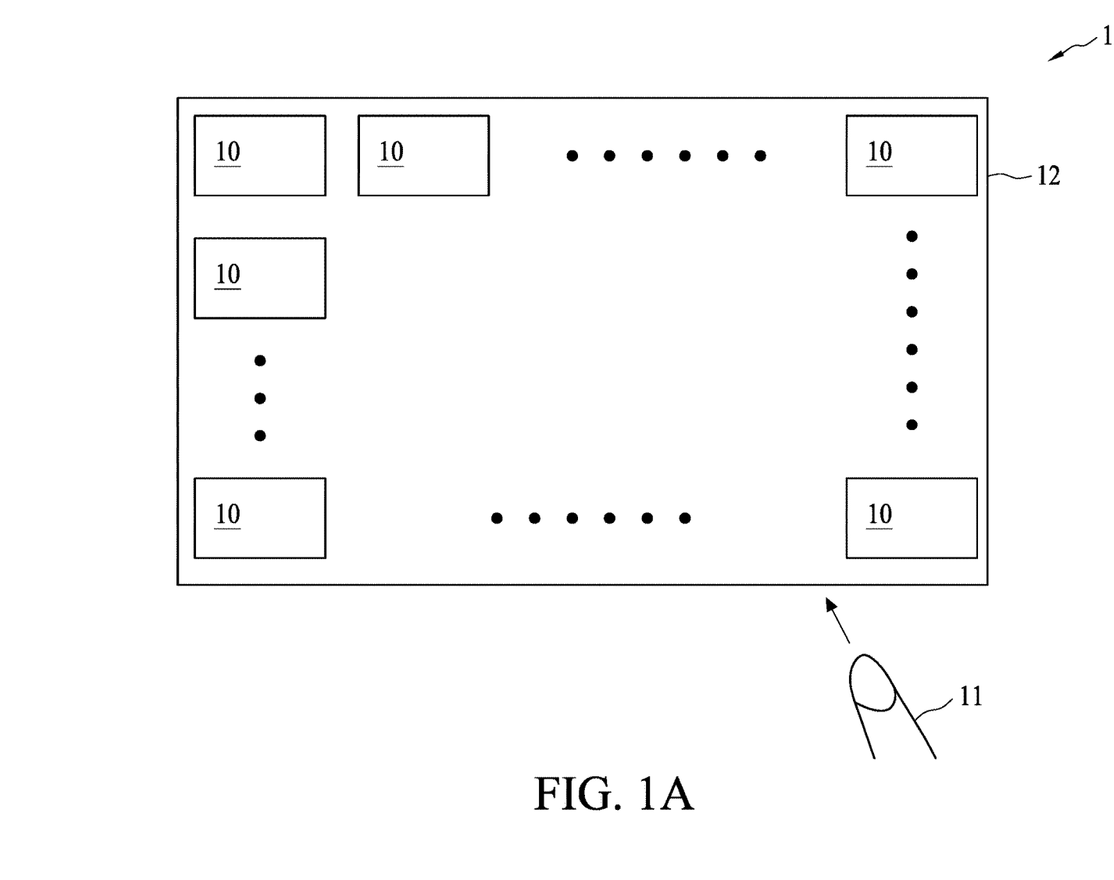
FIG. 1A is a top view of a sensing device.

FIG. 1A is a top view of an exemplary sensing device 1. The sensing device 1 is adapted to work with an electronic device, such as a smart phone, a laptop computer, a personal digital assistant or a tablet. Referring to FIG. 1A, the sensing device 1 includes a sensing array having a plurality of sensing units 10 covered by a passivation layer 12. The sensing units 10 are configured to sense a touch event of an object 11, such as a finger or a touch pen, touching the sensing device 1 via the passivation layer 12.

Figure 1B:
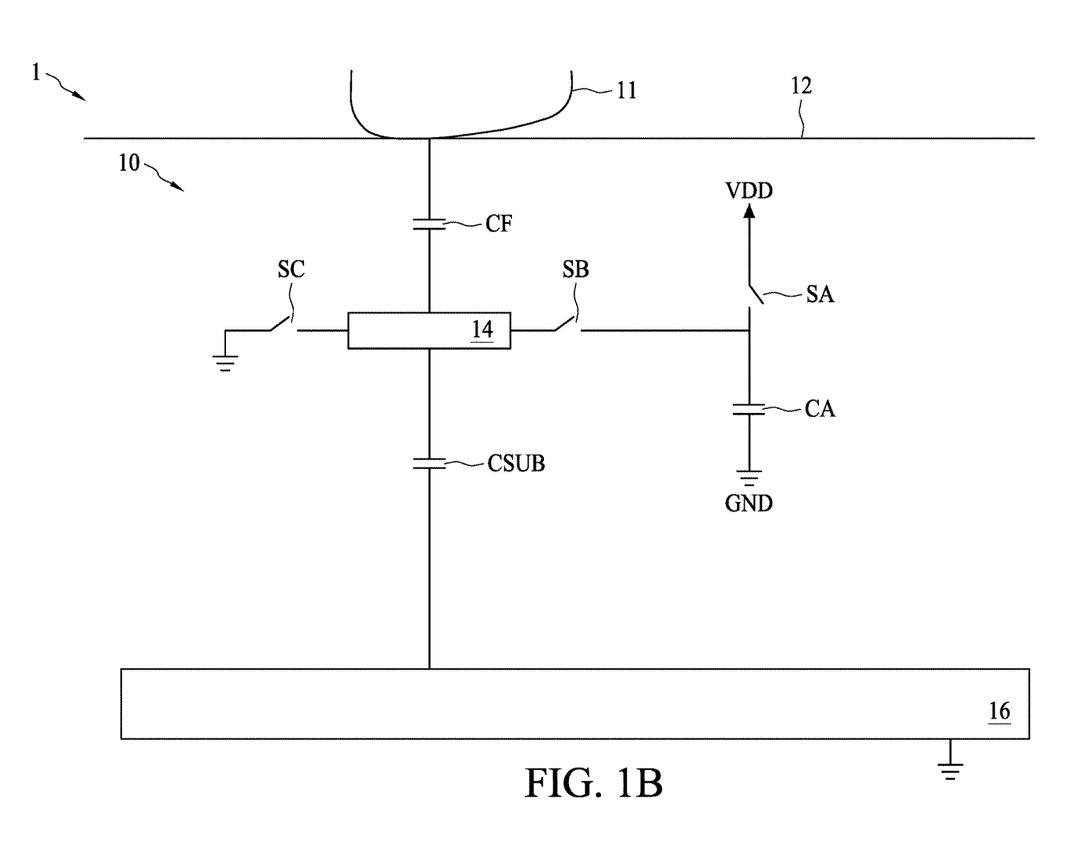
FIG. 1B is a schematic diagram of an exemplary sensing unit of the sensing device shown in FIG. 1A in prior art.

FIG. 1B is a schematic circuit diagram of an exemplary sensing unit 10 of the sensing device 1 shown in FIG. 1A in prior art. Referring to FIG. 1B, the sensing device 1 includes a substrate 16, on which the sensing units 10 are disposed. For illustration, only one sensing unit 10 is shown in FIG. 1B.

The sensing unit 10 includes a sensing component 14, a capacitor CA and switches SA, SB and SC. The sensing component 14 detects a touch capacitance CF associated with the object 11 in response to a touch event on the sensing device 1. Moreover, the sensing component 14 and the substrate 16 define a capacitance Csub therebetween, which is a parasitic capacitance. The substrate 16 is substantially kept at a reference voltage GND.

For convenience, a same reference numeral or label is used to refer to a capacitor or, when appropriate, its capacitance throughout the disclosure, and vice versa. For example, while the reference label "CA" as above mentioned refers to a capacitor, it may represent the value of the capacitor.

The capacitor CA is charged by a supply voltage VDD, and accordingly store electrical energy when the switch SA is conducted. The capacitor CA, coupled between the supply voltage VDD and a reference voltage GND, may not be integrated with the sensing component 14 and the switches SA, SB and SC in a single chip or an integrated circuit. For example, the capacitor CA is mounted on a mother board to communicate with (or couple to) the sensing component 14 and the switches SA, SB, and SC. Such capacitor CA may consume a relatively large area and thus is not area efficient.

Operation of the sensing unit 10 includes two phases. In the first phase, when the switch SA is conducted, the capacitor CA is charged by the supply voltage VDD, and accordingly stores the electrical energy. Meanwhile, the switch SB is not conducted, and the switch SC is conducted. As a result, a voltage level of the sensing component 14 is reset to the reference voltage GND. An equivalent circuit of the sensing unit 10 operating in the first phase is illustrated in FIG. 1C.

In the second phase, the switches SA and SC are not conducted, and the switch SB is conducted. The electrical energy stored in the capacitor CA in the first phase is distributed among the capacitor CA, the capacitance Csub and the touch capacitance CF. An equivalent circuit of the sensing unit 10 operating in the second phase is illustrated in FIGS. 1D and 1E.

Figure 1C:
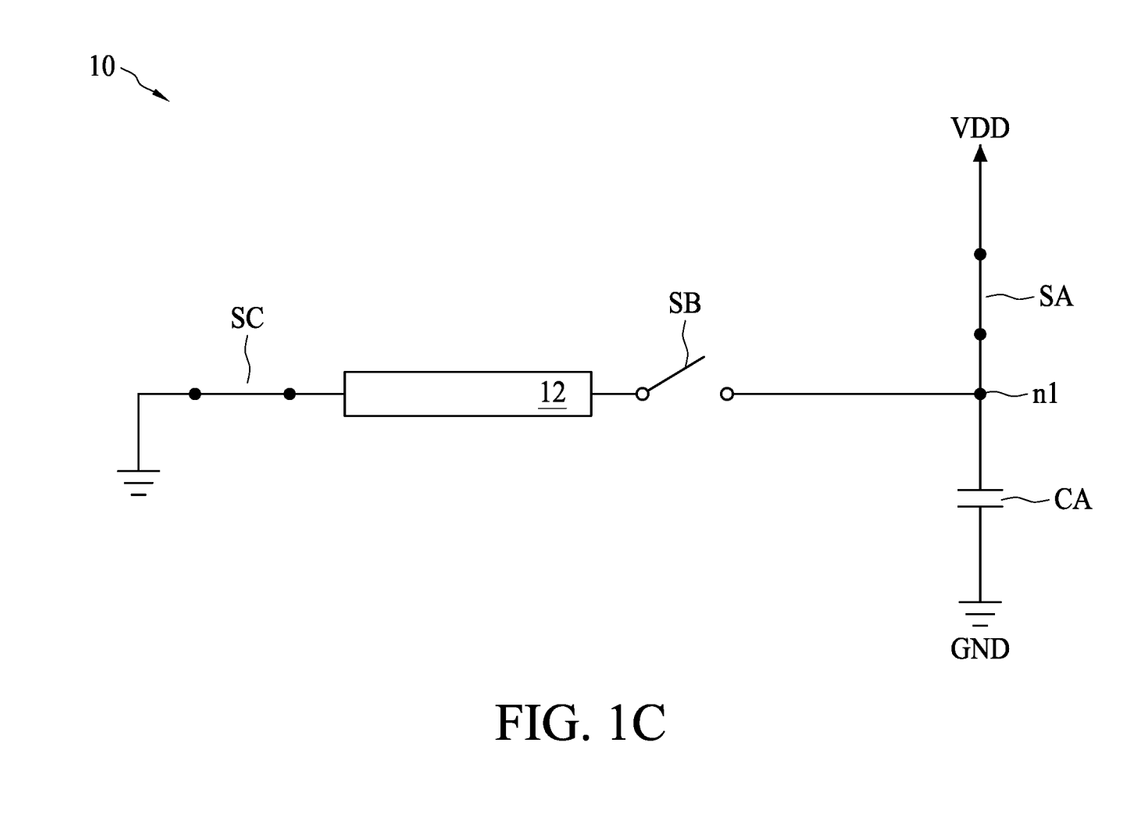
FIG. 1C is a circuit diagram of an equivalent circuit of the exemplary sensing unit operating in a first phase.
Figure 1D:
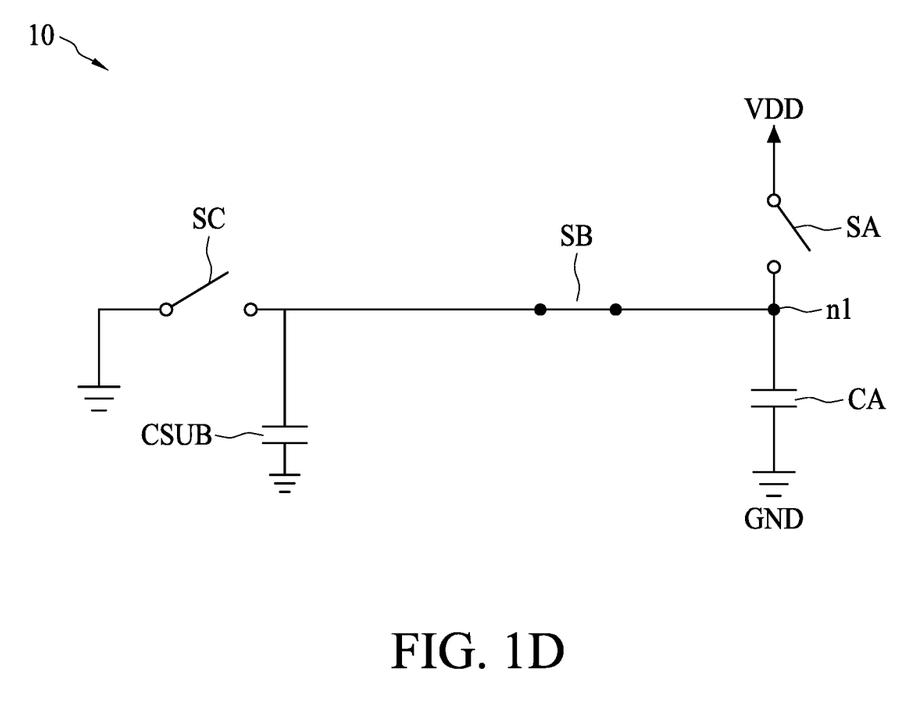
FIG. 1D is a circuit diagram of an equivalent circuit of the exemplary sensing unit operating in a second phase in the absence of a touch capacitance.
Figure 1E:
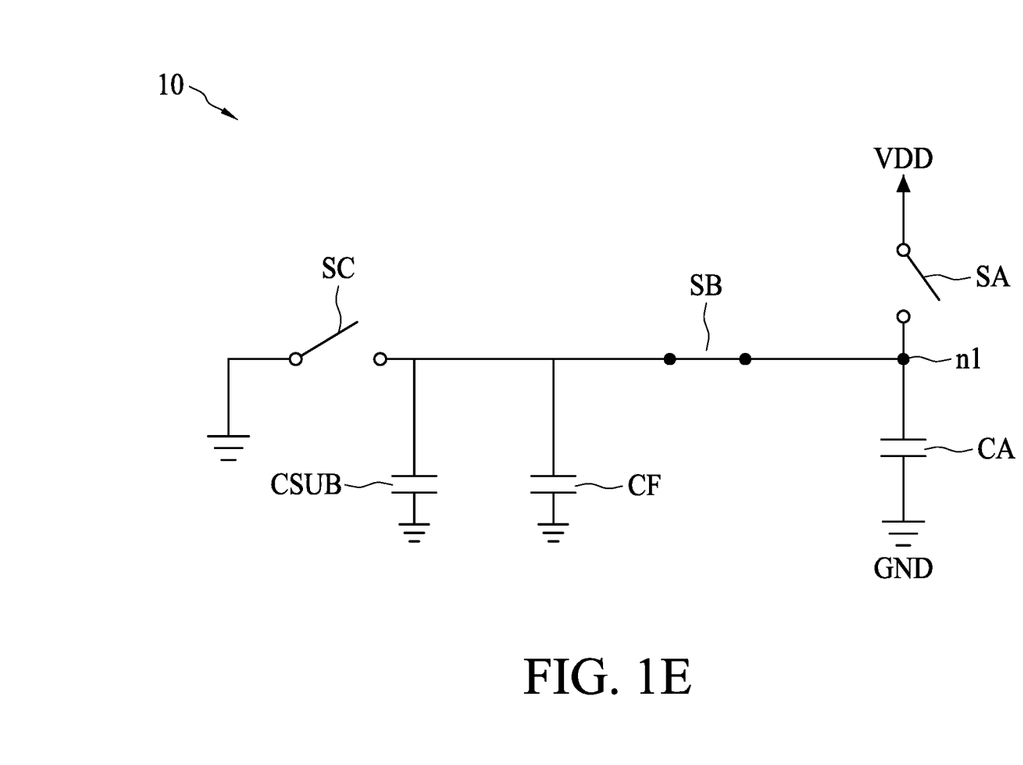
FIG. 1E is a circuit diagram of an equivalent circuit of the exemplary sensing unit operating in a second phase in the presence of a touch capacitance.

FIG. 1C is a circuit diagram of an equivalent circuit of the exemplary sensing unit 10 operating in the first phase. Referring to FIG. 1C, the capacitor CA is charged by the supply voltage VDD, and electrical energy is stored in the capacitor CA. Charge in the capacitor CA can be expressed in equation (1) below.

$$Q1_{(PH1)} = VDD \times CA \qquad (1)$$

where $Q1_{(PH1)}$ represents the charge in the capacitor CA.

FIG. 1D is a circuit diagram of an equivalent circuit of the exemplary sensing unit 10 operating in the second phase in the absence of the touch capacitance CF. Referring to FIG. 1D, the electrical energy stored in the capacitor CA is distributed between the capacitors CA and Csub, which satisfies equation (2) below.

$$Q1_{(PH2)} = Vn1_{(PH2)} \times (Csub + CA) \qquad (2)$$

where $Q1_{(PH2)}$ represents the total charge in the capacitors CA and Csub in phase 2 and $Vn1_{(PH2)}$ represents a voltage level at node n1 in phase 2.

Based on the law of charge conservation, the charge $Q1_{(PH1)}$ in phase 1 equals in quantity to the charge $Q1_{(PH2)}$ in phase 2. Based on equations (1) and (2), the voltage level $Vn1_{(PH2)}$ at node n1 in phase 2 can be expressed in equation (3) below.

$$Vn1 = \frac{VDD \times CA}{(Csub + CA)} \qquad (3)$$

FIG. 1E is a circuit diagram of an equivalent circuit of the exemplary sensing unit 10 operating in the second phase in the presence of the touch capacitance CF. Referring to FIG. 1E, electrical energy stored in the capacitor CA is distributed among the capacitors CA, Csub and CF. For the similar rationale as provided in the description of FIG. 1C, a voltage level $Vn1'_{(PH2)}$ at node n1 in phase 2 with the touch capacitance CF detected can be expressed in equation (4) below.

$$Vn1'_{(PH2)} = \frac{VDD \times CA}{(Csub + CA + CF)} \qquad (4)$$

By subtracting the voltage level $Vn1_{(PH2)}$ from the voltage level $Vn1'_{(PH2)}$, touch sensitivity can be determined. Difference ($\Delta V$) between the voltage levels $Vn1_{(PH2)}$ and $Vn1'_{(PH2)}$ can be expressed in equation (5) below.

$$\Delta V = \frac{-VDD \times CF}{(Csub + CA + CF)\left(1 + \frac{Csub}{CA}\right)} \quad (5)$$

Since the difference $\Delta V$ relates to the touch sensitivity of a sensing device, it is desirable to have a larger difference $\Delta V$ in order to achieve a higher touch sensitivity. That is, a relatively large difference facilitates the detection of a touch event. In view of equation (5), a possible way to increase the difference $\Delta V$ is to decrease the capacitance Csub in the denominator.

Figure 2:
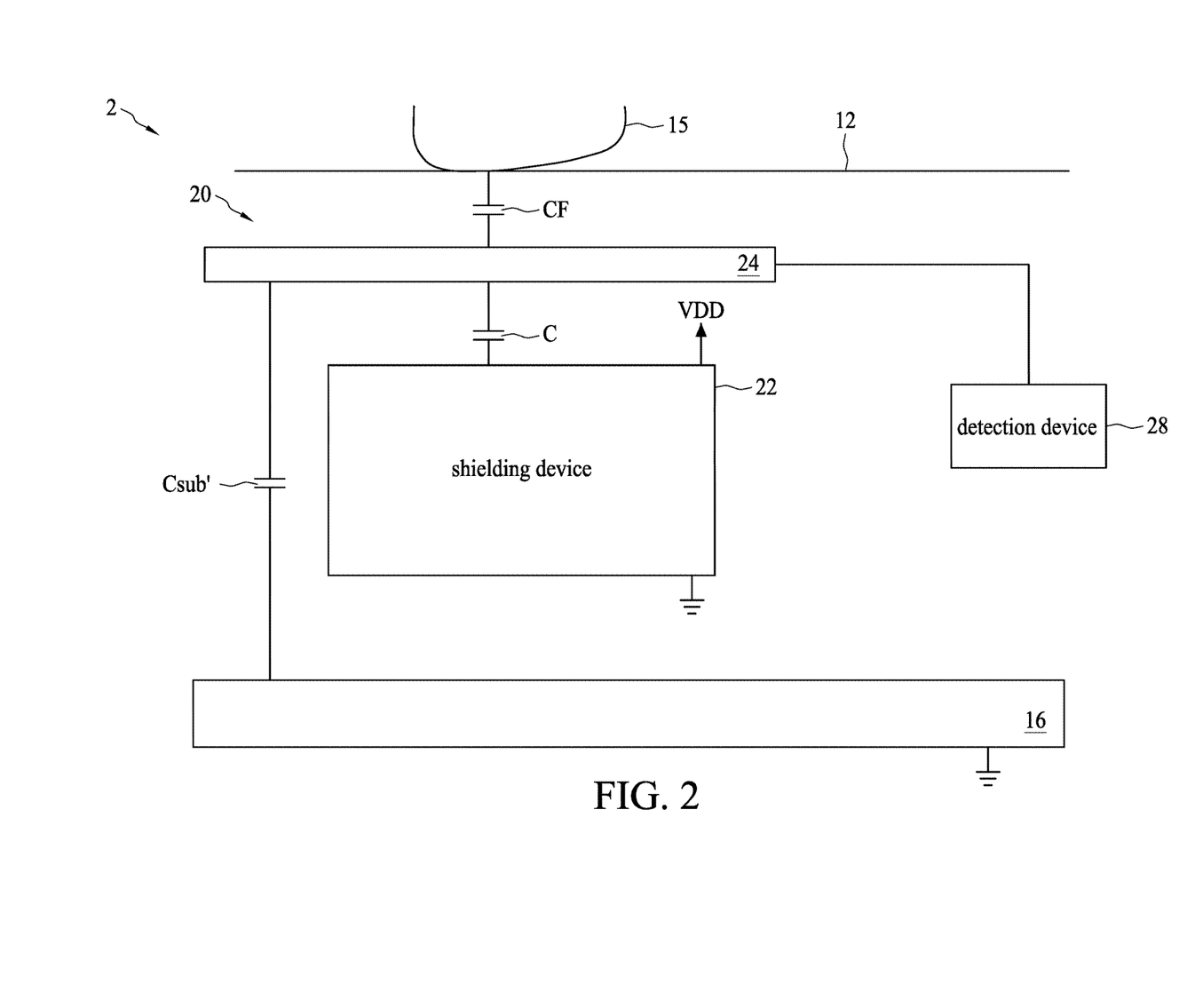
FIG. 2 is a schematic diagram of an exemplary sensing unit of a sensing device, in accordance with some embodiments of the present disclosure.

FIG. 2 is a schematic diagram of an exemplary sensing unit 20 of a sensing device 2, in accordance with some embodiments of the present disclosure. The sensing device 2 includes a plurality of the sensing units and a detection device 28. For the sake of convenience of illustration, only one sensing unit 20 is shown in FIG. 2. Referring to FIG. 2, the sensing unit 20 includes a sensing component 24 and a shielding device 22. The detection device 28, coupled to the plurality of sensing units 20, is configured to detect a voltage level at the sensing component 24 of the sensing unit 20 and determine if there is a touch event on the sensing device 2 based on a change in the voltage level. The detection device 28 includes, for example, a processor or a central processing unit (CPU).

The sensing component 24 is configured to, in response to a touch event on the sensing device 2, detect a touch capacitance CF associated with the object 11. Furthermore the sensing component 24 may be positioned in a metal 1 (M1) layer, a metal 2 (M2) layer or other suitable conductive layers over the substrate 16.

The shielding device 22 operates in a power domain of supply voltage VDD and reference voltage GND. Moreover, the shielding device 22 is configured to shield or mask the substrate 16 from the sensing component 24, or vice versa. Specifically, the shielding device 22 overlaps the sensing component 24 in physical structure so that efficient capacitance between the sensing component 24 and the substrate 16 is decreased, thereby increasing the touch sensitivity, as will be further discussed. In some embodiments, the shielding device 22 fully overlaps the sensing component 24. In some embodiments, the shielding device 22 overlaps a portion of the sensing component 24, and exposes the unshielded portion of the sensing component 24 to the substrate 16.

Furthermore, the shielding device 22 and the sensing component 24 are configured to define a capacitor C for storing electrical energy when the shielding device 22 is charged by the supply voltage VDD. Moreover, a capacitor Csub' is defined between the sensing component 24 and the substrate 16. The stored electrical energy is distributed between the capacitors C and Csub'.

Since at least a portion of the sensing component 24 is overlapped by the shielding device 22 and thus is shielded from the substrate 16, the effective capacitance Csub' is lower than the capacitance Csub described and illustrated with reference to FIG. 1B. In that case, voltage variation in the sensing component 24 becomes more significant and a voltage difference becomes more sensitive. Effectively, as previously discussed with respect to equation (5), a touch event can be more easy to detect, which will be described in detail with reference to FIGS. 3A to 3D.

Figure 3A:
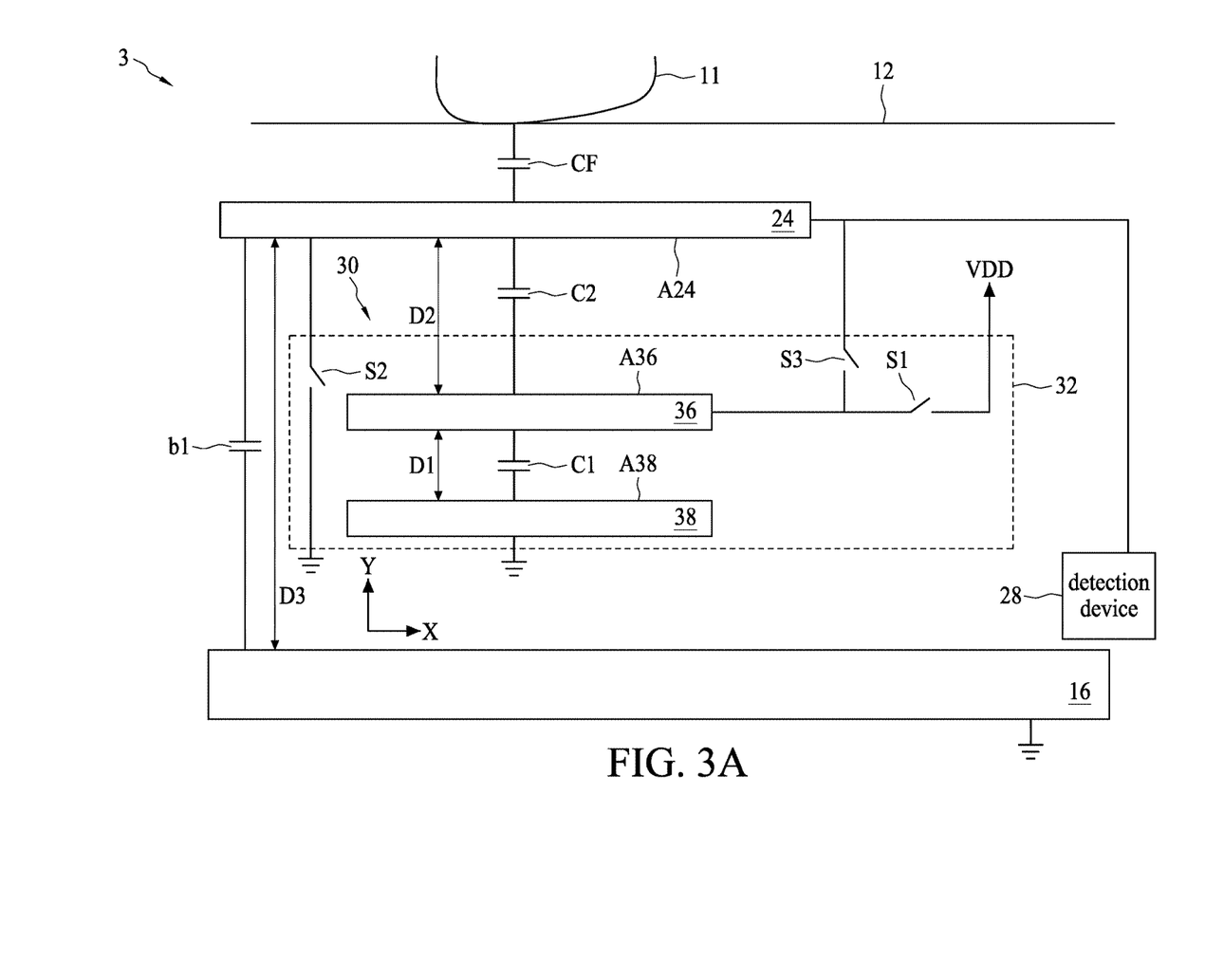
FIG. 3A is a schematic diagram of an exemplary sensing unit of a sensing device, in accordance with some embodiments of the present disclosure.

FIG. 3A is a schematic diagram of an exemplary sensing unit 30 of a sensing device 3, in accordance with some embodiments of the present disclosure. Referring to FIG. 3A, the sensing device 3 is similar to the sensing device 2 described and illustrated with reference to FIG. 2 except that, for example, the sensing unit 30 includes a first conductive component 36, a second conductive component 38, and switches S1, S2 and S3. The first conductive component 36 and the second conductive component 38 serve as a shielding device 32 between the sensing component 24 and the substrate 16. Moreover, the first conductive component 36 and the second conductive component 38 may be disposed in, for example, a metal 2 (M2) layer and a metal 1 (M1) layer, respectively, or in other different conductive layers. In an embodiment, the first conductive component 36 has substantially the same size as the second conductive component 38.

The first conductive component 36 and the second conductive component 38 are configured to define a first capacitance C1 for storing electrical energy. The first conductive component 36 and the second conductive component 38 are spaced apart by a distance D1, which is a factor of determining the first capacitance C1. The first capacitance C1 can be expressed in equation (6) below.

$$C1 = \varepsilon \frac{A1}{D1} \quad (6)$$

where $\varepsilon$ represents the dielectric constant of the material between the first conductive component 36 and the second conductive component 38, and A1 represents an area of a surface A36 of the first conductive component 36 (and also represents an area of a surface A38 of the second conductive component 38).

Moreover, the first conductive component 36 and the sensing component 24 are configured to define a second capacitance C2 for storing electrical energy. The first conductive component 36 and the sensing component 24 are spaced apart by a distance D2, which is a factor of determining the second capacitance C2. In an embodiment, the distance D2 is shorter than the distance D1. Given that a distance D3 between the sensing component 24 and the substrate 16 is fixed, the distance D1 increases as the distance D2 decreases, thereby decreasing the first capacitance C1 and hence increasing the touch sensitivity, as will be further discussed.

In addition, the second conductive component 38 is coupled to the reference ground GND. As such, the voltage between the second conductive component 38 and the substrate 16 is ideally equal to zero. Therefore, a space between the second conductive component 38 and the substrate 16 is free of any capacitance.

Additionally, the sensing component 24 and the substrate 16 are configured to define a capacitance b1. The sensing component 24 and the substrate 16 are spaced apart by a distance D3, which is a factor of determining the capacitance b1.

The first conductive component 36 and the second conductive component 38 are configured to shield the substrate 16 from the sensing component 24, and vice versa. Accordingly, the capacitance b1 can be expressed in equation (7) below.

$$b1 = \varepsilon \frac{(A2-A1)}{D3}, \text{ where } \frac{A1}{A2} = K, K \le 1 \quad (7)$$
$$= \varepsilon \frac{A2(1-K)}{D3}$$

where A2 represents an area of a surface A24 of the sensing component 24, the term (A2−A1) represents an effective area, which means the area of the surface A24 unshielded by the first conductive component 36 or the second conductive component 38 and thus exposed to the substrate 16, and K is a ratio of the area of the surface A36 of the first conductive component 36 to that of the surface A24 of the sensing component 24. K, having a value not greater than one, represents a percentage that the sensing component 24 is overlapped or shielded by the first conductive component 36. Specifically, the sensing component 24 is overlapped by the first conductive component 36 in an overlap ratio of K. When K is smaller than 1, a portion of the surface A24 of the sensing component 24 is shielded. When K equals 1, the sensing component 24 is entirely shielded by the first conductive component 36 or the second conductive component 38.

Based on equations (6) and (7), the capacitance b1 can be rearranged in equation (8) below.

$$b1 = C1 \frac{D1}{K} \frac{(1-K)}{D3} \quad (8)$$

In the present embodiment, the first conductive component 36 is configured to shield a portion of the sensing component 24 from the substrate 16, and the unshielded portion of the sensing component 24 is exposed to the substrate 16.

The switches S1 and S2 are configured to be conducted when switch S3 is not conducted, and vice versa. Each of the switches S1, S2 and S3 includes, for example, a field-effect transistor (FET), or a metal-Oxide-Semiconductor field-effect transistor (MOSFET).

Operation of the sensing unit 30 includes two phases. In the first phase, the switch S1 is conducted, and the first and second capacitors C1 and C2 are charged by a supply voltage VDD, and accordingly store electrical energy. Meanwhile, since the switch S3 is not conducted and the switch S2 is conducted, the sensing component 24 is reset to the reference voltage GND. An equivalent circuit of the sensing unit 30 operating in the first phase is illustrated in FIG. 3B.

In the second phase, the switches S1 and S2 are not conducted, and the switch S3 is conducted. Electrical energy stored in the capacitors C1 and C2 in the first phase is distributed among the capacitors C1, b1 and CF. Since the switch S3 is conducted, the voltage level at the sensing component 24 is the same as that at the first conductive component 36. An equivalent circuit of the sensing unit 30 operating in the second phase is illustrated in FIGS. 3C and 3D.

Figure 3B:
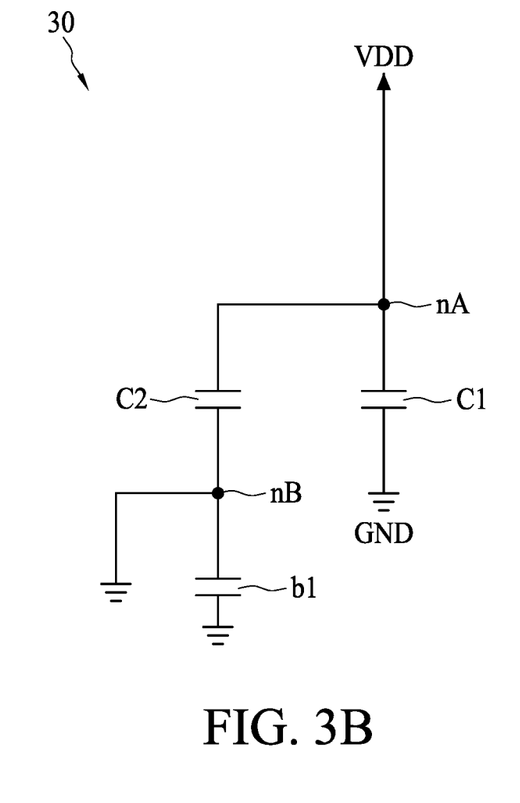
FIG. 3B is a circuit diagram of an equivalent circuit of the exemplary sensing unit operating in a first phase, in accordance with some embodiments of the present disclosure.
Figure 3C:
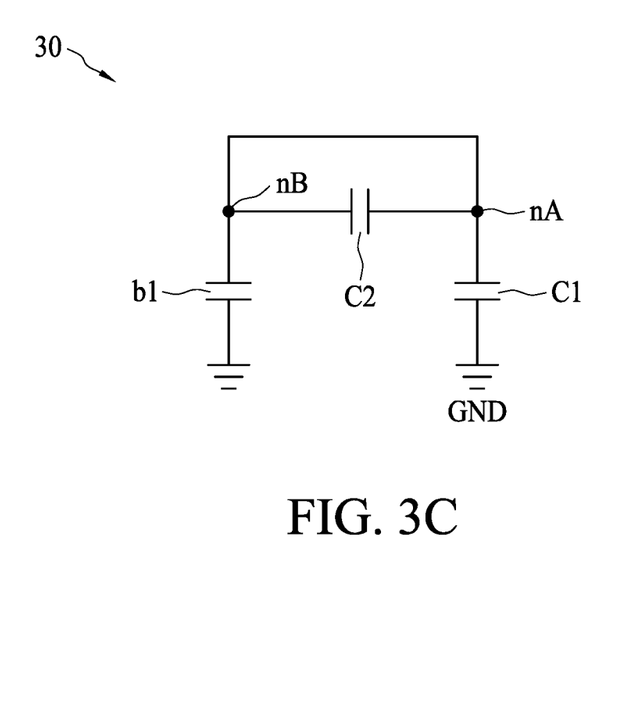
FIG. 3C is a circuit diagram of an equivalent circuit of the exemplary sensing unit operating in a second phase in the absence of a touch capacitance, in accordance with some embodiments of the present disclosure.
Figure 3D:
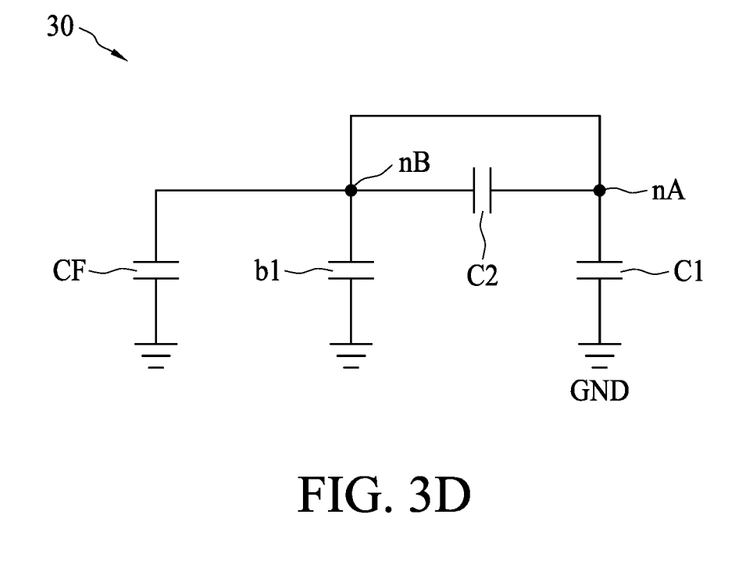
FIG. 3D is a circuit diagram of an equivalent circuit of the exemplary sensing unit operating in a second phase in the presence of a touch capacitance, in accordance with some embodiments of the present disclosure.

FIG. 3B is a circuit diagram of the equivalent circuit of the exemplary sensing unit 30 operating in the first phase. Referring to FIG. 3B, as the first and second capacitors C1 and C2 are charged by the supply voltage VDD, charge stored in the first and second capacitors C1 and C2 can be expressed in equations (9) and (10) below.

$$QNA_{(PH1)} = VDD \times (C1) + VDD \times (C2) \quad (9)$$

$$QNB_{(PH1)} = -VDD \times (C2) \quad (10)$$

where $QNA_{(PH1)}$ represents the positive charge stored in the first and second capacitors C1 and C2 at the side of a node nA in phase 1, and $QNB_{(PH1)}$ represents the negative charge stored in C2 at the side of a node nB in phase 1.

FIG. 3C is a diagram of the equivalent circuit of the exemplary sensing unit 30 operating in the second phase in the absence of the touch capacitance CF. Referring to FIG. 3C, due to the conducted state of the switch S3 in the second phase, a voltage level at node nA is the same as that at node nB. As a result, the voltage across the second capacitor C2 is zero and thus electrical energy is no longer stored in the second capacitor C2. Electrical energy stored in the first and second capacitors C1 and C2 in the first phase are distributed between the first capacitor C1 and the capacitor b1, which observes equation (11) below.

$$QNA_{(PH2)} = VnA_{(PH2)} \times (b1+C1) \quad (11)$$

where $QNA_{(PH2)}$ represents the charge stored in the first capacitor C1 and the capacitor b1 in phase 2, and $VnA_{(PH2)}$ represents a voltage level at node nA in phase 2 in the absence of the touch capacitance CF.

Based on the law of charge conservation, equation (12) is obtained below.

$$QNA_{(PH2)} = QNA_{(PH1)} + QNB_{(PH1)} \quad (12)$$

Based on equations (9), (10), (11) and (12), the voltage level $VnA_{(PH2)}$ at node nA in phase 2 can be expressed in equation (13) below.

$$VnA_{(PH2)} = \frac{VDD \times C1}{(C1+b1)} \quad (13)$$

FIG. 3D is a circuit diagram of the equivalent circuit of the exemplary sensing unit 30 operating in the second phase in the presence of the touch capacitance CF. Referring to FIG. 3D, electrical energy stored in the first and second capacitors C1 and C2 is distributed among the first capacitor C1, the capacitor b1 and the touch capacitor CF. For the similar rationale as provided in the description of FIG. 3C, a voltage level at node nA in phase 2 with the touch capacitance CF detected can be expressed in equation (14) below.

$$VnA' = \frac{VDD \times C1}{(b1+C1+CF)} \quad (14)$$

where VnA' represents the voltage level at node n1 in phase 2 with the touch capacitance CF detected.

By subtracting the voltage level VnA from the voltage level VnA', touch sensitivity can be determined. Difference (ΔV1) between the voltage levels VnA and VnA' is expressed in equation (15) below.

$$\Delta V1 = \frac{-VDD \times CF}{(b1+C1+CF)\left(1+\frac{b1}{C1}\right)} \quad (15)$$

Compared equation (15) with equation (5), ΔV1 is greater than ΔV for at least the reasons as follows. Firstly, for the capacitance defined between the sensing component and the substrate, Csub in equation (5) is greater than b1 in equation (15). As previously discussed, in the embodiment of FIG.

3A, the sensing component 24 is shielded by the first conductive component 36 and the second conductive component 38. Therefore, the capacitance b1 in equation (15) is lower than the capacitance Csub in equation (5). As a result, the difference (ΔV1) described in the embodiment of FIG. 3A is greater than the difference (ΔV) described and illustrated with reference to FIG. 1B. Since a larger difference results in a higher sensitivity, a touch event can be more easy to detect by the sensing unit 30 of the embodiment shown in FIG. 3A.

Secondly, for the capacitance charged by a supply voltage, CA in equation (5) is greater than C1 in equation (15). Generally, the capacitance of the capacitor CA not integrated in a sensing unit is greater than that of the capacitance C1 defined in an integrated circuit. Moreover, as previously discussed, by a proper arrangement of the first conductive component 36 and the second conductive component 38 in layout design of the sensing unit 30, a relatively small or desirable first capacitance C1 can be achieved. With the relatively small capacitance C1, the difference (ΔV1) described in the embodiment of FIG. 3A is greater than the difference (ΔV) described and illustrated with reference to FIG. 1B. As a result, a touch event can be more easy to detect by the sensing unit 30 of the embodiment shown in FIG. 3A.

Further, by substituting b1 in equation (8) into equation (15), the difference (ΔV1) can be further expressed in equation (16) as follows:

$$\Delta V1 = \frac{-VDD \times CF}{\left(\left(C1\frac{(1-K)D1}{K \times D3}\right) + C1 + CF\right)\left(1 + \frac{D1}{K} \times \frac{1-K}{D3}\right)} \quad (16)$$

$$= \frac{-VDD \times CF}{\left[\left(C1 \times \frac{(1-K)D1 + KD3}{KD3}\right) + CF\right] \times \left[1 + \frac{(1-K) \times D1}{K \times D3}\right]}$$

Based on equation (16), it can be found that the difference (ΔV1) is a function of K.

Figure 4:
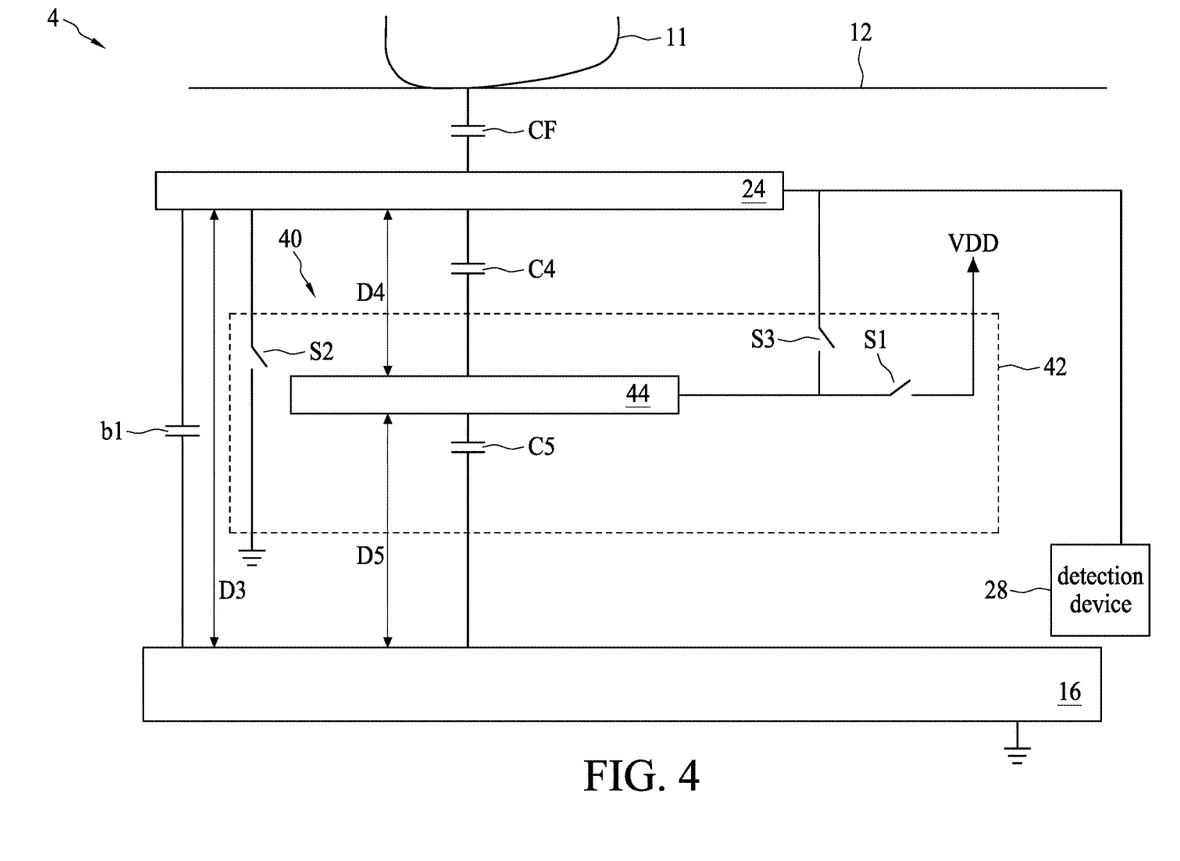
FIG. 4 is a schematic diagram of a sensing unit of a sensing device, in accordance with some embodiments of the present disclosure.

FIG. 4 is a schematic diagram of an exemplary sensing unit 40 of a sensing device 4, in accordance with some embodiments of the present disclosure. Referring to FIG. 4, the sensing unit 40 is similar to the sensing unit 30 described and illustrated with reference to FIG. 3A except that, for example, the sensing unit 40 includes a shielding device 42 formed by a single conductive component 44. The conductive component 44 may be disposed in, for example, a metal 1 (M1) layer, or another conductive layer over the substrate 16. For illustration, only one sensing unit 40 is shown in FIG. 4.

The conductive component 44, disposed between the sensing component 24 and the substrate 16, is configured to shield the substrate 16 from the sensing component 24, and vice versa. In some embodiments, the substrate 16 is fully shielded from the sensing component 24 by the conductive component 44. In other embodiments, the conductive component 44 is configured to shield or mask a portion of the sensing component 24.

Moreover, the conductive component 44 and the sensing component 24 are configured to define a capacitance C4 for storing electrical energy. The conductive component 44 and the sensing component 24 are spaced apart by a distance D4, which is a factor of determining the capacitance C4.

The conductive component 44 and the substrate 16 are configured to define a capacitance C5 for storing electrical energy. The conductive component 44 and the substrate 16 are spaced apart by a distance D5, which is a factor of determining the capacitance C5. In some embodiments, the distance D5 is longer than the distance D4. In that case, as previously discussed, the capacitance C5 is relatively small, which facilitates the detection of a touch event. Compared with the embodiment of FIG. 3A, since in the present embodiment only one conductive component (i.e., the conductive component 44) is present between the sensing component 24 and the substrate 16, the distance D5 between the sensing component 24 and the substrate 16 can be adjusted to be relatively long in the layout design. As a result, the capacitance C5 can be relatively small.

Based on the similar discussion in the embodiment of FIG. 3A, the difference (ΔV2) between a voltage level at the conductive component 44 with a touch capacitance CF detected and a voltage level at the conductive component 44 without the touch capacitance CF being detected can be expressed in equation (17) below.

$$\Delta V2 = \frac{-VDD \times CF}{(b1 + C5 + CF)\left(1 + \frac{b1}{C5}\right)} \quad (17)$$

Compared equation (17) with equation (15), given that the conductive component 44 has the same size as the first conductive component 36 and the second conductive component 38, the capacitance for storing electrical, C1 in equation (15) and C5 in equation (17), is different. Due to the relatively long distance D5, the capacitance C5 in equation (17) is smaller, resulting in a higher sensitivity.

Although in language specific to structural features and/or methodological acts of the subject matter has been described, it is to be understood that the appended claims is not necessarily limited to the subject matter defined the specific features or acts described above. Rather, the specific features and acts described above as example forms of implementing the claims are disclosed.

Various operations of embodiments are provided herein. The order in which some or all of the operations are described should not be construed as to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A sensing device, comprising:
   a substrate;
   a sensing component, configured to detect a touch capacitance in response to a touch event on the sensing device; and
   a shielding device between the substrate and the sensing component, configured to distribute electrical energy, and shield the substrate from the sensing component;
   wherein the shielding device comprises:
   a first conductive component over the substrate; and
   a second conductive component between the substrate and the first conductive component, configured to define a capacitance together with the first conductive component, for storing electrical energy;
   wherein a distance between the first conductive component and the sensing component is smaller than that between the first conductive component and the second conductive component.

2. The sensing device of claim 1, wherein the sensing component and the shielding device are configured to define a capacitance for storing electrical energy.

3. The sensing device of claim 1, wherein the sensing component is fully shielded from the substrate by the first and second conductive components.

4. The sensing device of claim 1, wherein the first conductive component is configured to overlap a portion of the sensing component.

5. The sensing device of claim 1, wherein the sensing component is overlapped by the first conductive component in an overlap ratio of K, wherein a difference between a first voltage level at the sensing component with the touch capacitance detected and a second voltage level at the sensing component without the touch capacitance detected is a function of K.

6. The sensing device of claim 5, wherein the difference can be expressed as follows:

$$\Delta V1 = \frac{-VDD \times CF}{\left[\left(C1 \times \frac{(1-K)D1 + KD3}{KD3}\right) + CF\right] \times \left[1 + \frac{(1-K) \times D1}{K \times D3}\right]}$$

where ΔV1 represents the difference between the first voltage level and the second voltage level, VDD represents a supply voltage, CF represents the touch capacitance, D1 represents a distance between the first conductive component and the second conductive component, and D3 represents a distance between the sensing component and the substrate.

7. The sensing device of claim 1, wherein the first and second conductive components are disposed between the substrate and the sensing component.

8. The sensing device of claim 1, wherein in response to an event that the shielding device distributes electrical energy, a voltage level of the first conductive component is the same as that of the sensing component.

9. The sensing device of claim 1, wherein the second conductive component and the substrate are coupled to a reference voltage.

10. A sensing device, comprising:
    a substrate;
    a sensing component, configured to detect a touch capacitance in response to a touch event on the sensing device; and
    a shielding device between the substrate and the sensing component, configured to distribute electrical energy, and shield the substrate from the sensing component;
    wherein the shielding device comprises:
    a conductive component, configured to shield the substrate from the sensing component,
    wherein the conductive component and the substrate are configured to define a capacitance for storing electrical energy;
    wherein the sensing component is overlapped by the conductive component in an overlap ratio of K, wherein a difference between a first voltage level at the sensing component with the touch capacitance detected and a second voltage level at the sensing component without the touch capacitance detected is a function of K.

11. The sensing device of claim 10, wherein the sensing component is fully shielded from the substrate by the conductive component.

12. The sensing device of claim 10, wherein the conductive component is disposed between the sensing component and the substrate.

13. The sensing device of claim 10, wherein the conductive component is configured to overlap a portion of the sensing component.

* * * * *